(12) United States Patent
Tokunaga

(10) Patent No.: US 11,232,581 B2
(45) Date of Patent: Jan. 25, 2022

(54) INFORMATION PROCESSING APPARATUS, INFORMATION PROCESSING METHOD, AND RECORDING MEDIUM

(71) Applicant: SONY CORPORATION, Tokyo (JP)

(72) Inventor: Makoto Daniel Tokunaga, Kanagawa (JP)

(73) Assignee: SONY GROUP CORPORATION, Tokyo (JP)

( * ) Notice: Subject to any disclaimer, the term of this patent is extended or adjusted under 35 U.S.C. 154(b) by 0 days.

(21) Appl. No.: 16/633,633

(22) PCT Filed: May 22, 2018

(86) PCT No.: PCT/JP2018/019566
§ 371 (c)(1),
(2) Date: Jan. 24, 2020

(87) PCT Pub. No.: WO2019/026389
PCT Pub. Date: Feb. 7, 2019

(65) Prior Publication Data
US 2020/0234462 A1    Jul. 23, 2020

(30) Foreign Application Priority Data

Aug. 2, 2017   (JP) .............................. JP2017-149956

(51) Int. Cl.
*G06T 7/70*   (2017.01)
*G06T 5/20*   (2006.01)

(52) U.S. Cl.
CPC ................. *G06T 7/70* (2017.01); *G06T 5/20* (2013.01); *G06T 2207/30244* (2013.01)

(58) Field of Classification Search
CPC .... G06T 5/20; G06T 5/10; G06T 5/30; G06T 5/50; G06T 7/70; G06T 7/73; G06T 7/74;
(Continued)

(56) References Cited

U.S. PATENT DOCUMENTS 9,525,822 B2 * 12/2016 Tsuchiya .................. G03B 5/00
2004/0017517 A1 *  1/2004 Alvarez .................. G06T 7/254
348/700

(Continued)

FOREIGN PATENT DOCUMENTS

CN       107018288 A      8/2017
JP       2011-223580 A   11/2011
(Continued)

OTHER PUBLICATIONS

International Search Report and Written Opinion of PCT Application No. PCT/JP2018/019566, dated Aug. 21, 2018, 08 pages of ISRWO.

*Primary Examiner* — Claire X Wang
*Assistant Examiner* — Stephen M Brinich
(74) *Attorney, Agent, or Firm* — Chip Law Group

(57) ABSTRACT

An information processing apparatus includes a reducing unit that performs reduction processing to reduce a position or a posture. The information processing apparatus further includes a correcting unit that performs correction processing to correct a reduction error that is caused by the reduction processing, based on temporal change data indicating changes over time relating to the position or the posture.

11 Claims, 4 Drawing Sheets

(58) Field of Classification Search
CPC .... G06T 7/75; G06T 7/77; G06T 7/80; G06T 2207/30244; G06T 2207/30241
USPC ....... 382/103, 100, 107, 236, 151, 216, 295, 382/291
See application file for complete search history.

(56) References Cited

U.S. PATENT DOCUMENTS

| | | | |
|---|---|---|---|
| 2006/0050783 A1* | 3/2006 | Le Dinh | H04N 5/208 375/240.2 |
| 2008/0088711 A1* | 4/2008 | Border | G06T 7/194 348/222.1 |
| 2009/0245639 A1* | 10/2009 | Erdler | G06T 5/20 382/173 |
| 2017/0163894 A1 | 6/2017 | Wakamatsu | |
| 2017/0310909 A1* | 10/2017 | Nishimura | G06T 5/002 |

FOREIGN PATENT DOCUMENTS

| | | |
|---|---|---|
| JP | 2015-222925 A | 12/2015 |
| JP | 2017-111430 A | 6/2017 |

* cited by examiner

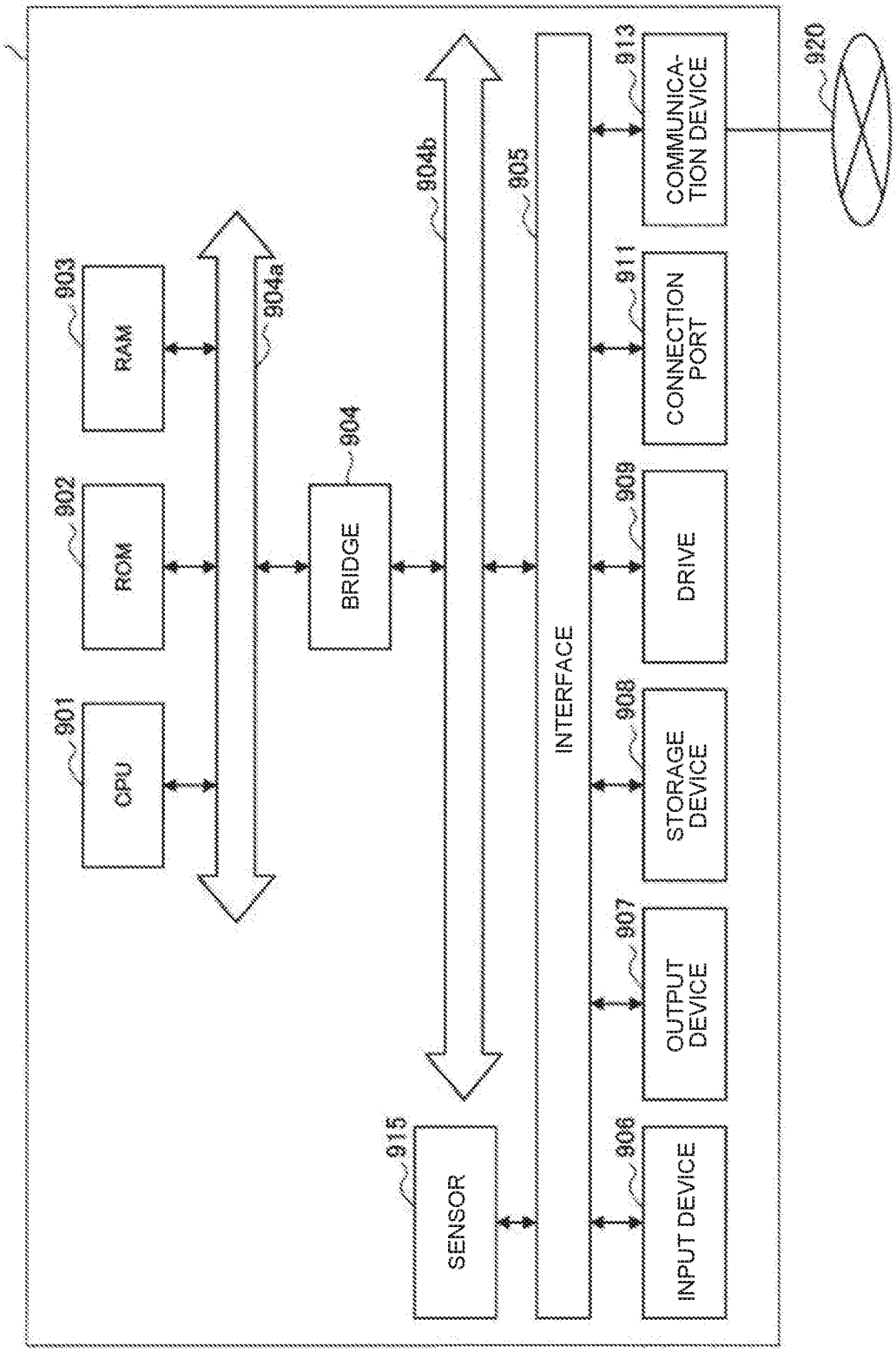

INFORMATION PROCESSING APPARATUS, INFORMATION PROCESSING METHOD, AND RECORDING MEDIUM

CROSS REFERENCE TO RELATED APPLICATIONS

This application is a U.S. National Phase of International Patent Application No. PCT/JP2018/019566 filed on May 22, 2018, which claims priority benefit of Japanese Patent Application No. JP 2017-149956 filed in the Japan Patent Office on Aug. 2, 2017. Each of the above-referenced applications is hereby incorporated herein by reference in its entirety.

FIELD

The present disclosure relates to an information processing apparatus, an information processing method, and a recording medium.

BACKGROUND

A technique of estimating a position and a posture of a camera in real space based on a captured image acquired by imaging by a camera has been known. Data of the estimated position and posture is used, for example, for display in AR (augmented reality) technology or VR (virtual reality) technology.

Estimated positions and postures can include errors. If display is performed based on a position and a posture including an error, inconsistency can occur. For this, correction of an error for an estimated posture has also been performed (for example, Patent Literature 1 below).

CITATION LIST

Patent Literature

Patent Literature 1: JP-A-2011-223580

SUMMARY

Technical Problem

However, because correction of errors by the technique as described above is not based on human perceptual characteristics, for example, when display is performed based on a position and a posture acquired by correction, there is a possibility of causing user discomfort. Therefore, there has been a demand for performing correction relating to a position or a posture considering human perceptual characteristics.

Solution to Problem

According to the present disclosure, an information processing apparatus is provided that includes: a reducing unit that perform reduction processing to reduce a change of any one of a position and a posture; and a correcting unit that performs correction processing to correct a reduction error that is caused by the reduction processing, based on temporal change data indicating changes over time relating to any one of the position and the posture.

Moreover, according to the present disclosure, an information processing method is provided that includes: performing reduction processing to reduce a change of any one of a position and a posture; and performing correction processing to correct a reduction error that is caused by the reduction processing, based on temporal change data indicating changes over time relating to any one of the position and the posture.

Moreover, according to the present disclosure, a computer-readable recording medium is provided that stores a program to implement: a function of performing reduction processing to reduce a change of any one of a position and a posture; and a function of performing correction processing to correct a reduction error that is caused by the reduction processing, based on temporal change data indicating changes over time relating to any one of the position and the posture.

Advantageous Effects of Invention

As described above, according to the present disclosure, because correction relating to a position and a posture is performed considering human perceptual characteristics, it is possible to reduce user discomfort caused by display based on the position and the posture.

Note that the above effect is not necessarily limited, and either one of effects described in the present specification, or other effects that can be understood from the present specification can be produced, together with the above effect, or instead of the above effect.

BRIEF DESCRIPTION OF DRAWINGS

FIG. 5 is a block diagram illustrating an example of a hardware configuration of the information processing apparatus 1 according to the same embodiment.

DESCRIPTION OF EMBODIMENTS

Figure 1:
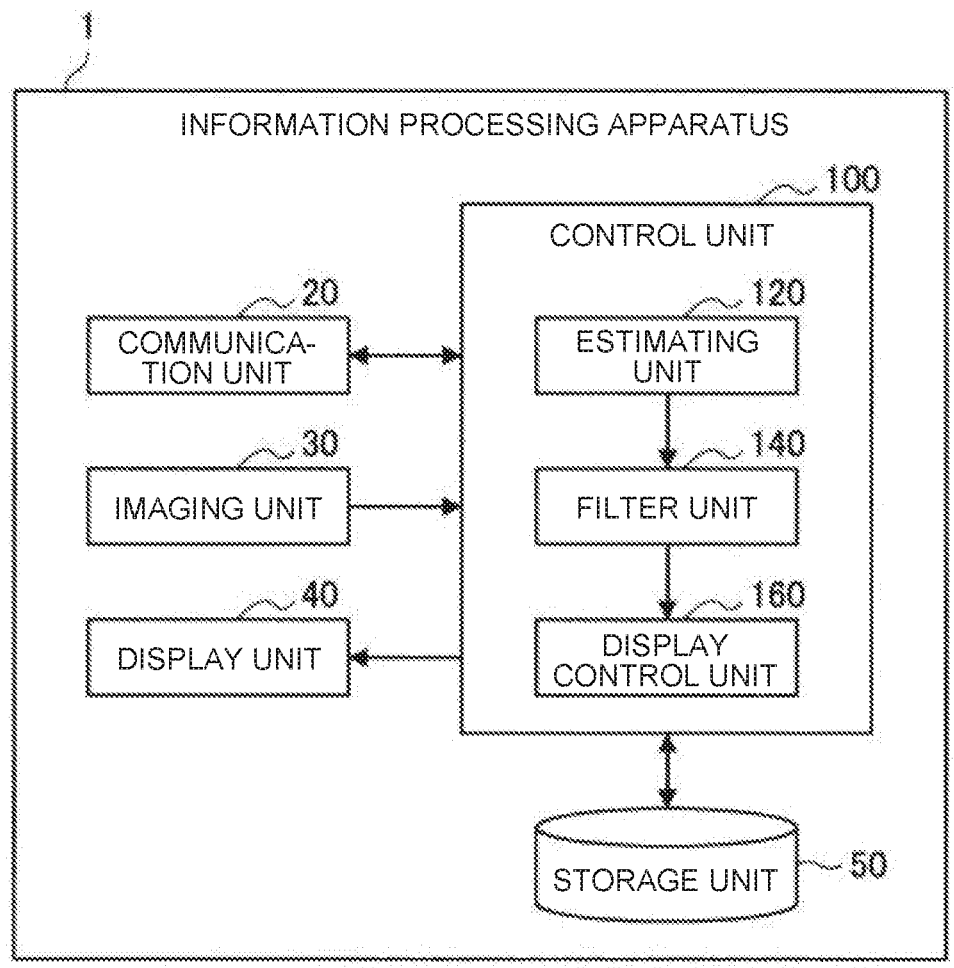
FIG. 1 is a block diagram illustrating an example of a configuration of an information processing apparatus 1 according to an embodiment of the present disclosure.

Exemplary embodiments of the present disclosure will be described in detail below, referring to the accompanying drawings. In the present application and drawings, duplicated explanation is omitted by using common reference signs for components having substantially the same functional configuration.

Moreover, in the present application and drawings, components having substantially the same functional configuration may be distinguished by adding different alphabetic signs at the end of the common reference sign. However, when it is not necessary to particularly distinguish respective components having substantially the same functional configuration, only the common reference sign is used.

Description will be given in following order.
<<1. Background>>
<<2. Configuration>>
<2-1. Configuration of Information processing apparatus>
<2-2. Configuration of Filter Unit>
<<3. Operation>>
<<4. Modifications>>

<4-1. First Modification>
<4-2. Second Modification>
<4-3. Third Modification>
<<5. Hardware Configuration Example>>
<<6. Conclusion>>

1. BACKGROUND

Before explaining about the information processing apparatus according to one embodiment of the present disclosure, the background to creation of the information processing apparatus according to one embodiment of the present disclosure will be described.

In recent years, technologies called AR (augmented reality) technology and VR (virtual reality) technology have been receiving attention. For example, when a head-mounted display (hereinafter, also referred to as "HMD") that is mounted on a head of a user is used as a display device in the AR technology and the VR technology, display of the HMD can be performed based on a position and a posture of the HMD in real space.

For example, by the AR technology, display making the user feel as if a virtual object is present in real space is possible by determining a position and a posture of the virtual object to be displayed on the HMD based on a position and a posture of the HMD in real space. Moreover, by the VR technology, display making the user feel as if the user is in virtual space is possible by changing (for example, changing a viewpoint) virtual space to be displayed on the HMD according to a position and a posture of the HMD in real space.

The position and the posture of the HMD can be acquired by various methods and, for example, may be estimated based on a captured image that is acquired by imaging by a camera mounted on the HMD. In this case, for example, by detecting feature points from a captured image acquired by imaging, the position and the posture can be estimated based on matching of the feature points. The feature point matching can be performed by comparing feature amounts of the feature points between the detected feature points and feature points detected in a previous frame, or and feature points included in an environmental map prepared in advance, or the like.

Data of the position and posture estimated as described above can include an error. As a result, fluctuations can occur in a display on the HMD, for example, according to the error included in the data of the estimated position and posture. For example, in the AR technology, a position and a posture of a virtual object displayed on the HMD can fluctuate according to the error. Furthermore, in the VR technology, entire virtual space displayed on the HMD can fluctuate. Such fluctuations become a cause of user discomfort. For example, when a virtual object is to be displayed as it is in contact with an actual object, if a position and a posture of the virtual object fluctuate due to fluctuations of the position and the posture, there is a possibility that the user feels as if the virtual object moves apart from the actual object.

Moreover, when the position and the posture are estimated incrementally based on captured images chronologically acquired, errors can be accumulated. Moreover, the estimation accuracy of the position and the posture is susceptible to the number of detected feature points, or matched feature points and, for example, when feature points are not detected in sufficient quantity, or when the number of matched feature points is small, the estimation accuracy tends to decrease.

Because of this, for example, when it shifts from a state in which the number of feature points detected from an image or matched feature points is small to a state in which the number is large, there is a case in which data of estimated position and posture changes abruptly even though the position and the posture of the HMD have not significantly changed actually. In such a case, a significant change can occur in a display on the HMD according to the change of the data of the estimated position and posture.

For example, in the AR technology, when the data of the estimate position and posture abruptly changes, the position and the posture of a virtual object displayed on the HMD can change abruptly. Moreover, in the VR technology, when virtual space displayed on the HMD can change abruptly. The abrupt change of the data of the estimated position and posture described above is a result caused by improved estimation accuracy, and is a change to reduce errors and, therefore, it is considered that a display performed after the change is a more consistent display, either in a case of the AR technology and the VR technology. However, an abrupt change caused in a display before and after such a change can cause user discomfort.

Thus, in view of the above circumstances, the present embodiment has been achieved. According to the present embodiment, by performing correction relating to a position and a posture based on human perceptual characteristics, it is possible to reduce user discomfort caused by a display based on a position and a posture in the AR technology, the VR technology, and the like. In the following, one embodiment of the present disclosure having such an effect will be described in detail.

2. CONFIGURATION

<2-1. Configuration of Information Processing Apparatus>

A configuration of an information processing apparatus according to one embodiment of the present disclosure will be described, referring to FIG. 1. FIG. 1 is a block diagram illustrating an example of a configuration of an information processing apparatus 1 according to the present embodiment. As illustrated in FIG. 1, the information processing apparatus 1 according to the present embodiment includes a communication unit 20, an imaging unit 30, a display unit 40, a storage unit 50, and a control unit 100. Although an example in which the information processing apparatus 1 is an HMD is described in the following, the present embodiment is not limited to the example, and other examples will be described as modifications later.

The communication unit 20 is a communication module to perform transmission and reception of data with other devices in a wired/wireless manner. The communication unit 20 communicates with an external device directly or through a network access point by wireless communication, for example, by a scheme, such as a wired LAN (local area network), a wireless LAN, Wi-Fi (wireless fidelity, registered trademark), infrared communication, Bluetooth (registered trademark), and a near-field/non-contact communication.

The imaging unit 30 acquires a captured image by imaging, to provide to the control unit 100. The captured image acquired by the imaging unit 30 is not limited to a still image, but can include a chronological moving image. Moreover, the imaging unit 30 includes, respective parts of an lens system constituted of an imaging lens, an aperture, a zoom lens, a focus lens, and the like, a driving system that causes the lens system to perform a focus operation and a zoom operation, a solid-state imaging device array that subjects imaging light acquired by the lens system to photoelectric conversion, to generate an imaging signal, and the like. The solid-state imaging device array may be implemented by, for example, a CCD (charge coupled device) sensor array, or a CMOS (complementary metal oxide semiconductor) sensor array. Furthermore, the imaging unit 30 may be provided in plurality in the information processing apparatus 1.

The display unit 40 is controlled by the control unit 100 described later, to perform a display operation. The display unit 40 is implemented by a lens unit (an example of a transmission display unit) that performs display, for example, by using a hologram optical technique, a liquid crystal display (LCD) device, an OLED (organic light emitting diode) device, and the like. Moreover, the display unit 40 may be of a transmission type, a semi-transmission type, or of non-transmission type.

The storage unit 50 stores a program for the control unit 100 described later to perform respective functions and parameters. Furthermore, the storage unit 50 may function as a buffer that temporarily stores data relating to a position and a posture of a predetermined period, in accordance with the control by the control unit 100 described later.

The control unit 100 functions as an arithmetic processing device and a control device, and controls the overall operation in the information processing apparatus 1 according to various kinds of programs. Moreover, the control unit 100 according to the present embodiment functions as an estimating unit 120, a filter unit 140, and a display control unit 160 as illustrated in FIG. 1.

The estimating unit 120 estimates a position and a posture of the information processing apparatus 1 in real space based on the captured image acquired by imaging by the imaging unit 30, and acquires data relating to a position and a posture as an estimation result. Note that the information processing apparatus 1 is assumed to be mounted on the head of a user in the present embodiment and, therefore, the position and the posture estimated by the estimating unit 120 are regarded as a position and a posture of the head of the user. Estimation of a position and a posture by the estimating unit 120 can be performed by various methods, but may be performed, for example, by a method based on matching of feature points detected from a captured image as described above.

The data relating to a position and a posture acquired by the estimating unit 120 may be data relating to a position and a posture in a three-dimensional coordinate system that is set in advance, associating with real space, or may be data relating to a position and a posture in a three-dimensional coordinate system set by the information processing apparatus 1. Furthermore, the data relating to a position and a posture acquired by the estimating unit 120 may be data relating to a relative position with respect to a predetermined actual object that exists in real space, and a posture.

Moreover, the data relating to a position and a posture acquired by the estimating unit 120 as an estimation result is input to the filter unit 140 chronologically.

The filter unit 140 performs correction based on human perceptual characteristics with respect to the data relating to a position and a posture chronologically input from the estimating unit 120. The filter unit 140 outputs the data relating to a position and a posture subjected to the correction to the display control unit 160. Details of the filter unit 140 will be described later, referring to FIG. 2.

The display control unit 160 controls display by the display unit 40 based on the data relating to a position and a posture subjected to correction, which is output data of the filter unit 140. For example, the display control unit 160 may control display such that a virtual object is visually recognized at a predetermined position in real space, based on the data relating to a position and a posture. When the display unit 40 is a non-transmission type, the display control unit 160 may control display such that the virtual object is visually recognized at a predetermined position in real space by superimposing the virtual object on a captured image of real space acquired by the imaging unit 30. Moreover, the display control unit 160 may display virtual space based on the data relating to a position and a posture.

Note that data relating to a virtual object or virtual space to be displayed by the display control unit 160 may be acquired from, for example, the storage unit 50, or may be acquired from another device through the communication unit 20.

A configuration of the information processing apparatus 1 according to the present embodiment has been specifically described as above, but the configuration of the information processing apparatus 1 according to the present embodiment is not limited to the example illustrated in FIG. 1. For example, the information processing apparatus 1 may include a sensor that senses information around the information processing apparatus 1 in addition to the imaging unit 30, or a part of the functions of the control unit 100 may be present in another device connected through the communication unit 20.

<2-2. Configuration of Filter Unit>

Figure 2:
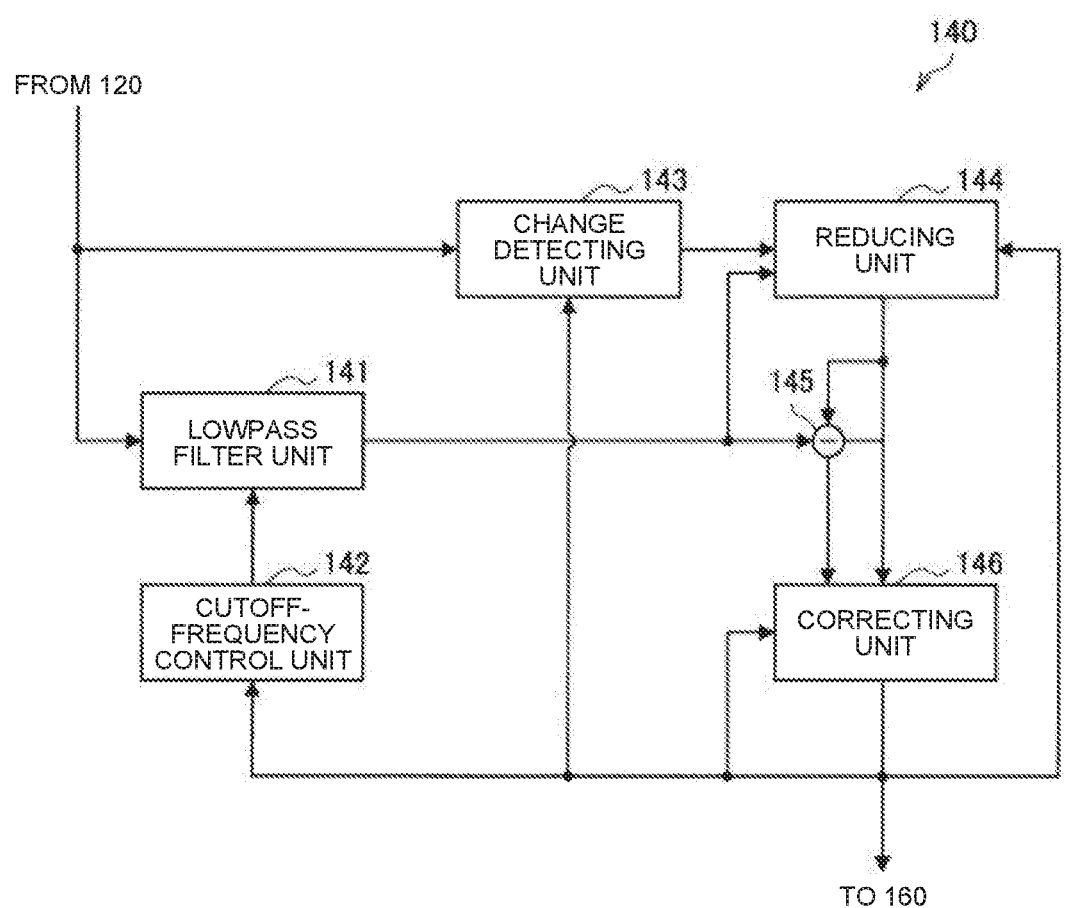
FIG. 2 is a block diagram illustrating an example of a configuration of a filter unit 140 according to the same embodiment.

Subsequently, a more detail configuration example of the filter unit 140 illustrated in FIG. 1 will be described in the following. FIG. 2 is a block diagram illustrating an example of a configuration of the filter unit 140. As illustrated in FIG. 2, the filter unit 140 has functions as a lowpass filter unit 141, a cutoff-frequency control unit 142, a change detecting unit 143, a reducing unit 144, a subtracting unit 145, and a correcting unit 146.

As described above, to the filter unit 140, the data relating to a position and a posture, which is an estimation result of the estimating unit 120, is chronologically input. The chronological data input to the filter unit 140 may be a multidimensional signal relating to a position and a posture. Moreover, the functions of the filter unit 140 described below may be implemented by convolution of a signal, or may be implemented by a method, such as Kalman filter and weighed means.

In the following, an example in which a signal relating to a position and a posture input to the filter unit 140 is a displacement signal indicating a displacement from a predetermined reference point (for example, the origin in the three-dimensional coordinate system if it is a position) will be described. However, to the filter unit 140, a speed signal (an example of speed data) indicating changes over time of a position and a posture may be input, or an acceleration signal indicating an acceleration of a position and a posture may be input. Note that in the present application, denominations, displacement, speed, and acceleration include angular displacement (angle), angular speed, and angular acceleration, respectively.

Furthermore, the filter unit 140 is also capable of acquiring other signals by subjecting either one kind of signals out of the input displacement signal, speed signal, and acceleration signal to processing of differentiation or integration by a not shown differentiator or integrator. Therefore, the filter unit 140 may be designed appropriately according to a type of signals input to the filter unit 140 from the estimating unit 120. Moreover, hereinafter, a signal input to the filter unit 140 from the estimating unit 120, or a displacement signal, a speed signal, or an acceleration signal, which is the input signal not subjected to any processing other than differentiation or integration, are referred to as input displacement signal, input speed signal, or input acceleration signal, respectively in some cases.

The signal relating to a position and a posture may include, for example, a three-dimensional signal relating to a position and a three-dimensional signal relating to a posture. For example, when the data of a position is acquired as data in three-dimensional space with three directions of an X direction, a Y direction, and a Z direction as bases, the three-dimensional signal relating to a position may be a signal indicating a position in the respective three directions of the X direction, Y direction, and the Z direction. Moreover, in this case, the three-dimensional signal relating to a posture may be, for example, a signal indicating a rotation angle about the respective three directions of the X direction, the Y direction, and the Z direction as a center axis.

Furthermore, the filter unit 140 may perform processing with respect to signal of a predetermined period (predetermined number of frames). Moreover, the filter unit 140 may perform processing for each dimension independently, with respect to a multidimensional signal relating to a position and a posture. In the following, a common part out of the processing with respect to signals of respective dimensions will be described without distinguishing them.

Lowpass Filter Unit

The lowpass filter unit 141 performs lowpass filtering to remove a component (high frequency component) higher than a cutoff frequency set by the cutoff-frequency control unit 142 described later from an input speed signal. Furthermore, the lowpass filter unit 141 outputs a speed signal (having only components lower than the cutoff frequency) from which the high frequency component is removed to the reducing unit 144. Moreover, the speed signal output from the lowpass filter unit 141 is subject to integration by the not shown integrator, and then input to the subtracting unit in a form of a displacement signal.

Note that when the input displacement signal is input from the estimating unit 120 to the filter unit 140, the input speed signal that is obtained by subjecting the input displacement signal to primary differentiation by the differentiator not shown may be input to the lowpass filter unit 141.

With this configuration, fluctuations of a position and a posture can be suppressed, and as a result, fluctuations of display can be reduced.

Cutoff-Frequency Control Unit

The cutoff-frequency control unit 142 controls a cutoff frequency used by the lowpass filter unit 141 based on temporal change data indicating changes over time relating to a position or a posture.

In the example illustrated in FIG. 2, the cutoff-frequency control unit 142 determines a cutoff frequency by using data indicating changes over time of output data that is output by the correcting unit 146 (that is, output by the filter unit 140) in a form of a displacement signal of a position and a posture, as temporal change data. The cutoff-frequency control unit 142 may control a cutoff frequency based on the temporal change data according to a dimension corresponding to a dimension processed by the lowpass filter unit 141.

Human perception is influenced by a traveling speed of himself/herself, and there is a tendency that as the traveling speed increases, for example, fluctuations with respect to the traveling direction are less perceived as discomfort. Accordingly, the cutoff-frequency control unit 142 may control the cutoff frequency such that the cutoff frequency is high when the temporal change (speed) is large, and that the cutoff frequency is low when the temporal change (speed) is small. With this configuration, it is possible to reduce only fluctuations apt to be perceived as discomfort by the user.

Moreover, the cutoff-frequency control unit 142 may control the cutoff frequency further based on a dimension of a signal to be processed. Human perception is influenced by a traveling direction of himself/herself, and has a tendency to be less sensitive, for example, to fluctuations in the traveling direction of himself/herself than to fluctuations in a left-and-right direction and an up-and-down direction. Accordingly, the cutoff-frequency control unit 142 may control the cutoff frequency such that a cutoff frequency for a signal of a dimension corresponding to traveling in a front-and-back direction is higher than a cutoff frequency for signals of dimensions corresponding to the left-and-right direction and the up-and-down direction. With this configuration, it is possible to reduce only fluctuations apt to be perceived as discomfort by the user.

Change Detecting Unit

The change detecting unit 143 detects a change section in which an abrupt change has occurred at an estimated position and posture. The abrupt change may be, for example, such a change that a spike signal is generated in an input speed signal. Detection of the change section by the change detecting unit 143 can be performed by various methods. For example, the change detecting unit 143 may detect a section including a value larger than a threshold in an input speed signal that is acquired by subjecting an input speed signal to secondary differentiation. Note that the change detecting unit 143 may use different thresholds according to temporal change data, and may use, for example, a larger threshold as the temporal change (speed) becomes larger.

Reducing Unit

The reducing unit 144 acquires reduction data in which an abrupt change is reduced by performing reduction processing to reduce an abrupt change of an estimated position and posture. For example, the reducing unit 144 may acquire a speed signal subjected to reduction processing to bring a value included in a change section detected by the change detecting unit 143 closer to 0, out of a speed signal input by the lowpass filter unit 141, from which a high frequency component is removed, as the reduction data. For example, the reducing unit 144 may replace a value included in the change section with a predetermined value (for example, 0).

By the reduction processing as described above, the reducing unit 144 can reduce an amount of change of a position and a posture as a result of it. Note that the reducing unit 144 may perform the reduction processing according to the temporal change data, and for example, may decrease the intensity of the reduction processing as the temporal change (speed) increases.

With this configuration, an abrupt change of an estimated position and a posture is reduced, and an abrupt change in display is also reduced. As a result, it becomes possible to reduce user discomfort.

The reduction data acquired by the reducing unit 144 is a speed signal, and is integrated, for example, by an integrator not shown, and then input to the subtracting unit 145 and the correcting unit 146 in a form of a displacement signal.

Subtracting Unit

The subtracting unit 145 acquires a reduction error generated by the reduction processing performed by the reducing unit 144, based on the speed data output from the lowpass filter unit 141 and the reduction data acquired by the reducing unit 144. For example, the subtracting unit 145 may calculate (acquire) the reduction error, as a difference between the displacement signal that is acquired by integrating the speed signal output from the lowpass filter unit 141 and the reduction data that is input in a form of a displacement signal. The reduction error acquired by the subtracting unit 145 is input to the correcting unit 146.

Correcting Unit

The correcting unit 146 acquires output data that is output by the filter unit 140 by performing correction processing to correct the reduction error. For example, the correcting unit 146 may perform the correction processing by adding a correction value that is acquired by multiplying a correction coefficient between 0 and 1 and the reduction error together to the reduction data.

The correction processing performed by the correcting unit 146 is herein reviewed. When the correction coefficient described above is 1, that is when the reduction error is added to the reduction data as it is, only a displacement signal acquired by integrating the output of the lowpass filter unit 141 is acquired, and an effect of the reduction processing by the reducing unit 144 is not obtained, leaving a possibility to cause user discomfort. On the other hand, when the correction coefficient is 0, the reduction error is not corrected, and data relating to a position and a posture that are significantly different from original position and posture is to be continuously output, and there is a possibility that inconsistency derived therefrom continues to be caused in a display also.

Considering the above, it is preferable that the correcting unit 146 perform the correction processing with a correction coefficient close to 0 so that the reduction error is not corrected too much when the user is likely to perceive discomfort. Moreover, it is preferable that the correcting unit 146 perform the correction processing with a correction coefficient close to 1 so that the correction error is corrected more intensely when the user is less likely to perceive discomfort.

As described above, human perception is influenced by a traveling speed of himself/herself. Therefore, the correcting unit 146 may perform the correction processing based on the temporal change data. In the example illustrated in FIG. 2, the temporal change data may be data indicating changes over time of output data as described above.

The correcting unit 146 may perform the correction processing such that the reduction error is more intensely corrected as the temporal change (speed) becomes larger, based on the temporal change data. For example, the correcting unit 146 may perform the correction processing by using a larger (closer to 1) correction coefficient as the temporal change increases.

The output data acquired by the correction processing performed by the correcting unit 146 is output to the display control unit 160 as data relating to a position and a posture after correction.

3. OPERATION

As above, the configuration example of the information processing apparatus 1 according to the present embodiment, and the configuration example of the filter unit 140 included in the information processing apparatus 1 have been described. Subsequently, an operation example of the present embodiment will be described, referring to FIG. 3 and FIG. 4. In the following, a flow of overall processing of the information processing apparatus 1 will be described, referring to FIG. 3, and then a flow of processing relating to correction of data relating to a position and a posture performed by the filter unit 140 will be described, referring to FIG. 4.

Figure 3:
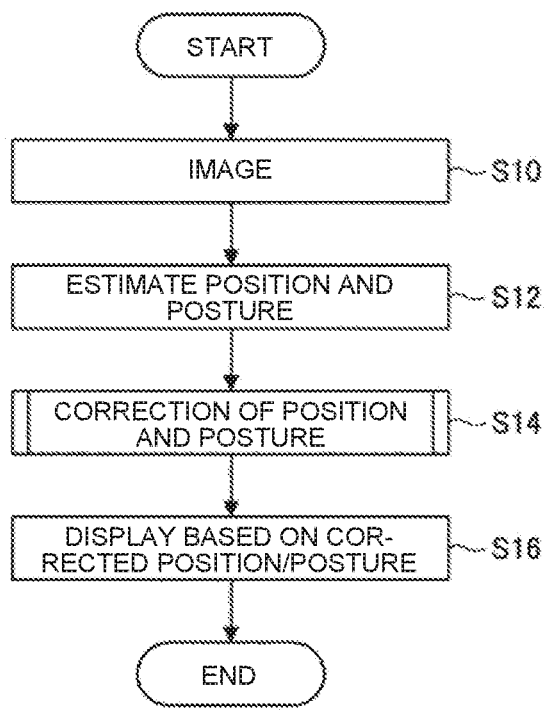
FIG. 3 is a flowchart illustrating an operation example of the information processing apparatus according to the same embodiment.

FIG. 3 is a flowchart illustrating an operation example of the information processing apparatus 1 according to the present embodiment. As illustrated in FIG. 3, first, the imaging unit 30 acquires a captured image by imaging (S10). Subsequently, the estimating unit 120 of the control unit 100 estimates a position and a posture of the information processing apparatus 1 in real space based on the captured image (S12).

Subsequently, the filter unit 140 performs correction relating to the position and the posture acquired at step S12 (S14). Note that the processing at this step S14 performed by the filter unit 140 will be describe later, referring to FIG. 4.

Subsequently, the display unit 40 perform display in accordance with a display control by the display control unit 160 based on the position and posture corrected at step S14 (S16)

As above, the overall operation of the information processing apparatus 1 according to the present embodiment has been described. Note that the processing at steps S10 to S16 in FIG. 3 may be repeated as appropriate.

Figure 4:
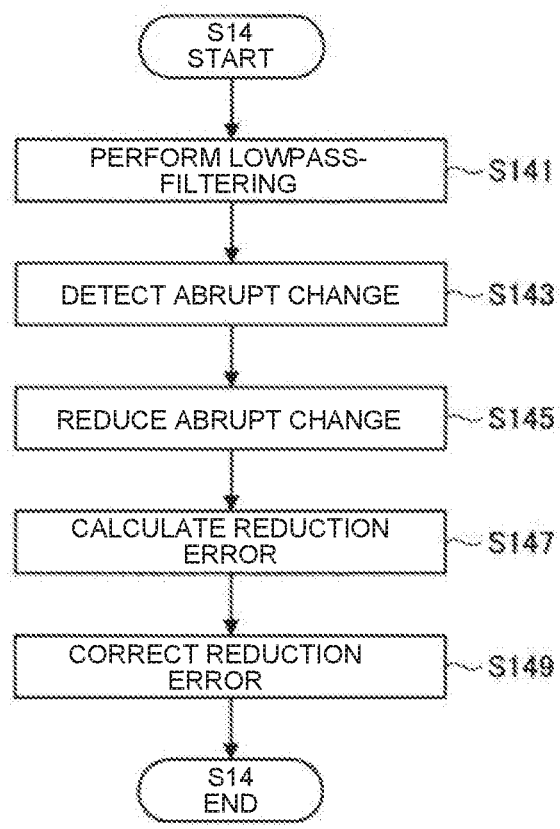
FIG. 4 is a flowchart illustrating a flow of processing at step S14.

FIG. 4 is a flowchart illustrating a flow of the processing at step S14 illustrated in FIG. 3. As illustrated in FIG. 4, first, the lowpass filter unit 141 performs lowpass filtering to remove a component higher than the cutoff frequency (high frequency component) (S141). Note that a control of the cutoff frequency by the cutoff-frequency control unit 142 may be performed at step S141.

Moreover, the change detecting unit 143 detects a change section in which an abrupt change has occurred in a position and a posture estimated at step S12 in FIG. 3 (S143). Subsequently, the reducing unit 144 performs the reduction processing to reduce the abrupt change in the estimated position and posture (S145). As described above, the reduction processing can be performed in the change section that is detected at step S143 in the signal acquired at step S145 from which the high frequency component is removed.

Subsequently, the subtracting unit 145 calculates a reduction error, as a difference between the signal acquired at step S141 from which the high frequency component is removed and the signal acquired at step S145 (S147).

Subsequently, the correcting unit 146 performs the correction processing to correct the reduction error calculated at step S147 (S149).

As above, the flow of processing relating to correction of data relating to a position and a posture by the filter unit 140 has been described. Note that order of the processing at step S141 and step S143 may be opposite, or the processing at step S141 and step S143 may be performed in parallel.

4. MODIFICATIONS

As above, one embodiment of the present disclosure has been described. In the following, some modifications of the present embodiment will be described. Note that the modifications described below may be applied singly to the present embodiment, or may be applied to the present embodiment in combination. Moreover, the respective modifications may be applied in place of the configuration described in the present embodiment, or may be applied in addition to the configuration described in the present embodiment.

<4-1. First Modification>

In the above description, an example in which the information processing apparatus 1 is an HMD that is mounted on the head of a user has been described, but the present embodiment is not limited thereto. For example, the information processing apparatus 1 according to the present embodiment may be a smartphone, a tablet terminal, or the like. In this case, the information processing apparatus 1 is, for example, held by the user, and as it moves with the user, the position and the posture may be changed.

<4-2. Second Modification>

Moreover, the information processing apparatus 1 may include a sensor that senses information around the information processing apparatus 1 in addition to the imaging unit 30 illustrated in FIG. 1. Furthermore, sensor data obtained by sensing by the sensor, or data estimated based on the sensor data may be input to the filter unit 140 as data relating to a position or a posture. For example, the information processing apparatus 1 may include a depth sensor that acquires depth data, an IMU (inertial measurement unit) that acquires an angular speed or an acceleration speed, and the like.

<4-3. Third Modification>

In the above description, an example in which data indicating changes over time of output data is used as the temporal change data has been described, but the present embodiment is not limited to the example. For example, the input speed signal may be used as the temporal change signal. Moreover, as described above, when the information processing apparatus 1 includes a sensor other than the imaging unit 30, data indicating changes over time of a position and a posture acquired based on sensing of the sensor may be used as the temporal change data. For example, the change detecting unit 143 may detect an abrupt change of a position and a posture estimated based on a capture image, based on the temporal change data acquired by sensing of the IMU, and with such a configuration, an abrupt change can be detected more accurately.

5. HARDWARE CONFIGURATION EXAMPLE

As above the embodiment of the present disclosure has been described. Finally, a hardware configuration of the information processing apparatus 1 according to the present embodiment will be described, referring to FIG. 5. FIG. 5 is a block diagram illustrating an example of the hardware configuration of the information processing apparatus 1 according to the present embodiment. The information processing by the information processing apparatus 1 according to the present embodiment is implemented by cooperation of software and hardware described below.

As illustrated in FIG. 5, the information processing apparatus 1 includes a CPU (central processing unit) 901, a ROM (read-only memory) 902, a RAM (random access memory) 903, and a host bus 904a. Moreover, the information processing apparatus 1 includes a bridge 904, an external bus 904b, an interface 905, an input device 906, an output device 907, a storage device 908, a drive 909, a connection port 911, a communication device 913, and a sensor 915. The information processing apparatus 1 may include a processing circuit, such as a DSP or an ASIC, in place of or together with the CPU 901.

The CPU 901 functions as an arithmetic processing device and a control device, and controls overall operation in the information processing apparatus 1 according to various kinds of programs. Furthermore, the CPU 901 may be a microprocessor. The ROM 902 stores a program and arithmetic parameters used by the CPU 901, and the like. The RAM 903 temporarily stores a program used in execution by the CPU 901, and parameters that changes as appropriate in the execution, and the like. The CPU 901 can form, for example, the control unit 100.

The CPU 901, the ROM 902, and the RAM 903 are connected to one another by the host bus 904a including a CPU bus. The host bus 904a is connected to the external bus 904b, such as a PCI (peripheral component interconnect/interface) through the bridge 904. Note that the host bus 904a, the bridge 904, and the external bus 904b are not necessarily required to be configured separately, but the functions thereof may be implemented by one bus.

The input device 906 is implemented by a device to which data is input by the user, such as a mouse, a keyboard, a touch panel, a button, a microphone, a switch, and a lever. Moreover, the input device 906 may be a remote control device using an infrared ray or other radio waves, or may be an external connecting device, such as a mobile phone and a PDA, that supports an operation of the information processing apparatus 1. Furthermore, the input device 906 may include an input control circuit that generates an input signal based on data input by the user, for example, by using the input means described above, and outputs it to the CPU 901. The user of the information processing apparatus 1 can input various kinds of data to the information processing apparatus 1, or to instruct processing operations by operating this input device 906.

The output device 907 is formed by a device capable of visually or aurally notifying about the acquired data to the user. Such a device includes a display device, such as a CRT display device, a liquid crystal display device, a plasma display device, an EL display device, and a lamp, a voice output device, such as a speaker and a headphone, a printer device, and the like. The output device 907 outputs a result obtained by various kinds of processing performed by the information processing apparatus 1. Specifically, the display device visually displays the result obtained by various kinds of processing performed by the information processing apparatus 1 in various forms, such as test, image, table, and a graph. On the other hand, the voice output device converts an audio signal constituted of reproduced voice data, acoustic data, and the like into an analog signal to aurally output it. The output device 907 can form, for example, the display unit 40.

The storage device 908 is a device for data storage, formed as an example of the storage unit of the information processing apparatus 1. The storage device 908 is implemented by, for example, a magnetic memory device, a semiconductor memory device, an optical memory device, a magneto-optical memory device, or the like. The storage device 908 may include a recording medium, a recording device that records data in the recording medium, a reading device that reads data from a recording medium, a deleting device that deletes data recorded in the recording medium, and the like. This storage device 908 stores a program that is executed by the CPU 901, various kinds of data, various kinds of data externally acquired, and the like. The storage device 908 can form, for example, the storage unit 50.

The drive 909 is a recording medium reader/writer, and is equipped in the information processing apparatus 1, or mounted externally. The drive 909 reads data stored in a removable recording medium, such as a magnetic disk, an optical disk, a magneto-optical disk, or a semiconductor memory, and outputs it to the RAM 903. Furthermore, the drive 909 can write data into the removable recording medium also.

The connection port 911 is an interface connected to an external device, and is a port to connect with an external device capable of transmitting data by, for example, a USB (universal serial bus), or the like.

The communication device 913 is a communication interface formed, for example, with a communication device to connect to a network 920 or the like. The communication device 913 is, for example, a communication card for wired or wireless LAN (local area network), an LTE (long term evolution), Bluetooth (registered trademark), or WUSB (wireless USB), or the like. Moreover, the communication device 913 may be a router for optical communications, a router for ADSL (asymmetric digital subscriber line), a modem for various kinds of communications, or the like. This communication device 913 can transmit and receive a signal and the like, conforming to a predetermined protocol, such as TCP/IP, on the Internet, or with other communication devices. The communication device 913 can form, for example, the communication unit 20.

The sensor 915 is, for example, various kinds of sensors, such as a camera, a microphone, an acceleration sensor, a gyro sensor, a geomagnetic sensor, an optical sensor, a range sensor (time-of-flight sensor, structured light sensor, infrared sensor, LIDAR sensor, and the like), and a force sensor. The sensor 915 acquires information about a state of the information processing apparatus 1 itself, such as a posture and a traveling speed of the information processing apparatus 1, and information relating to an ambient environment of the information processing apparatus 1, such as brightness and noise around the information processing apparatus 1. Moreover, the sensor 915 may include a GPS sensor that receives a GPS signal to measure a latitude, longitude, and an altitude of the device. The sensor 915 can form, for example, the imaging unit 30.

The network 920 is a wired or wireless transmission path of data transmitted from the devices connected to the network 920. For example, the network 920 may include a public network, such as the Internet, a telephone network, and a satellite communication network, various kinds of LAN (local area network) including Ethernet (registered trademark), a WAN (wide area network), and the like. Furthermore, the network 920 may include a dedicated network, such as IP-VPN (Internet protocol-virtual private network).

As above, one example of the hardware configuration that can implement the functions of the information processing apparatus 1 according to the embodiment of the present disclosure has been described. The respective components may be implemented by using general-purpose parts, or may be implemented by hardware specialized in functions of the respective components. Therefore, according to a technical level at each time when the embodiment of the present disclosure is implemented, the hardware configuration to be applied can be changed as appropriate.

Note that a computer program to implement respective functions of the information processing apparatus 1 according to the embodiment of the present disclosure as described above can be built and installed in a PC or the like. Moreover, a computer-readable recording medium in which such a computer program is stored can also be provided. The recording medium is, for example, a magnetic disk, an optical disk, a magneto-optical disk, a flash memory, or the like. Furthermore, the computer program described above may be distributed, for example, through a network without using a recoding medium.

6. CONCLUSION

As described above, according to the embodiment of the present disclosure, by performing correction relating to data of a position and a posture, considering human perceptual characteristics, it becomes possible to reduce user discomfort caused by a display based on the position and the posture.

As above, an exemplary embodiment of the present disclosure has been described in detail, referring to the accompanying drawings, but a technical range of the present disclosure is not limited to the example. It is obvious that those having common knowledge in the technical field of the present disclosure can think of various alteration examples or correction examples within a scope of the technical idea described in claims, and it is understood that these also belong to the technical scope of the present disclosure naturally.

For example, respective steps in the embodiment described above are not necessarily required to be performed chronologically according to the order described in the flowcharts. For example, the respective steps in the processing of the embodiment described above may be performed in different order from the order described in the flowcharts, or may be performed in parallel.

Furthermore, the example in which the control unit 100 having the function of the filter unit 140 is implemented by the CPU or the like has been described in the above description, but the present technique is not limited to the example. The function of the filter unit 140 may be implemented as a digital filter, or may be implemented as an analog filter.

Moreover, effects described in the present specification are only explanatory or exemplary ones, and are not limited. That is, the technique according to the present disclosure can produce other effects apparent from the description of the present specification to those skilled in the art in addition to the effects described above.

Note that configurations as described below also belong to the technical scope of the present disclosure.

(1)

An information processing apparatus comprising:

a reducing unit that perform reduction processing to reduce a change of any one of a position and a posture; and a correcting unit that performs correction processing to correct a reduction error that is caused by the reduction processing, based on temporal change data indicating changes over time relating to any one of the position and the posture.

(2)

The information processing apparatus according to (1), further comprising a lowpass filter unit that removes a component higher than a cutoff frequency from speed data according to any one of the position and the posture, to output, wherein the reducing unit subjects the speed data output from the lowpass filter unit to the reduction processing.

(3)

The information processing apparatus according to claim 2 further comprising a cutoff-frequency control unit that controls the cutoff frequency based on at least either one of a dimension according to the speed data, and the temporal change data.

(4)

The information processing apparatus according to (2) or (3), further comprising a change detecting unit that detects a change section in which the change has occurred, wherein the reducing unit brings a value included in the change section that is detected by the change detecting unit in the speed data to 0.

(5)

The information processing apparatus according to any one of (2) to (4), wherein the reduction error is acquired based on the speed data output from the lowpass filter unit and on data acquired as a result of the reduction processing.

(6)

The information processing apparatus according to any one of (1) to (5), wherein the correcting unit performs the correction processing such that the reduction error is corrected more intensely as the temporal change becomes larger.

(7)

The information processing apparatus according to any one of (1) to (6), wherein the temporal change data is data that indicates a temporal change of output data acquired as a result of the correction processing.

(8)

The information processing apparatus according to any one of (1) to (7), wherein any one of the position and the posture is estimated based on an image acquired by imaging.

(9)

The information processing apparatus according to (8), further comprising an estimating unit that estimates any one of the position and the posture based on feature points detected from the image.

(10)

The information processing apparatus according to any one of (1) to (9), further comprising a display control unit that controls display based on output data acquired as a result of the correction processing.

(11)

An information processing method comprising: performing reduction processing to reduce a change of any one of a position and a posture; and performing correction processing to correct a reduction error that is caused by the reduction processing, based on temporal change data indicating changes over time relating to any one of the position and the posture.

(12)

A computer-readable recording medium that stores a program to implement:

a function of performing reduction processing to reduce a change of any one of a position and a posture; and a function of performing correction processing to correct a reduction error that is caused by the reduction processing, based on temporal change data indicating changes over time relating to any one of the position and the posture.

REFERENCE SIGNS LIST

1 INFORMATION PROCESSING APPARATUS
20 COMMUNICATION UNIT
30 IMAGING UNIT
40 DISPLAY UNIT
50 STORAGE UNIT
100 CONTROL UNIT
120 ESTIMATING UNIT
140 FILTER UNIT
141 LOWPASS FILTER UNIT
142 CUTOFF-FREQUENCY CONTROL UNIT
143 CHANGE DETECTING UNIT
144 REDUCING UNIT
145 SUBTRACTING UNIT
146 CORRECTING UNIT
160 DISPLAY CONTROL UNIT

The invention claimed is:

1. An information processing apparatus, comprising:
a lowpass filter unit configured to:
remove a component, higher than a cutoff frequency of the lowpass filter unit, from first speed data based on at least one of a position of the information processing apparatus or a posture of the information processing apparatus; and
output second speed data based on the removal of the component higher than the cutoff frequency;
a reducing unit configured to:
execute a reduction process to reduce a change of the at least one of the position or the posture, wherein the reduction process is executed based on the second speed data; and
acquire reduction data based on the execution of the reduction process;
a subtraction unit configured to calculate a reduction error based on a difference between a displacement signal and the reduction data, wherein
the displacement signal corresponds to the second speed data output from the lowpass filter unit; and
a correcting unit configured to execute a correction process to correct the reduction error, wherein
the correction process is executed based on temporal change data, and
the temporal change data indicates a temporal change associated with the at least one of the position or the posture.

2. The information processing apparatus according to claim 1, wherein the reducing unit is further configured to execute the reduction process on the second speed data.

3. The information processing apparatus according to claim 2, further comprising a cutoff-frequency control unit configured to control the cutoff frequency based on at least one of the temporal change data, or a dimension associated with the second speed data.

4. The information processing apparatus according to claim 2, further comprising a change detecting unit configured to detect a change section, wherein
the change section corresponds to the change in the at least one of the position or the posture, and
the reducing unit is further configured to reduce a value of the second speed data included in the change section to zero.

5. The information processing apparatus according to claim 1, wherein the correcting unit is further configured to execute the correction process such that an intensity of the correction of the reduction error increases as the temporal change increases.

6. The information processing apparatus according to claim 1, wherein
the correction unit is further configured to output specific data based on the execution of the correction process, and
the temporal change data indicates the temporal change of the output specific data.

7. The information processing apparatus according to claim 1, further comprising an estimating unit configured to estimate the at least one of the position or the posture based on an image.

8. The information processing apparatus according to claim 7, wherein the estimating unit is further configured to estimate the at least one of the position or the posture based on feature points of the image.

9. The information processing apparatus according to claim 1, further comprising a display control unit, wherein
the correction unit is further configured to output specific data based on the execution of the correction process, and
the display control unit is configured to control display of an object based on the output specific data.

10. An information processing method, comprising:
removing a component, higher than a cutoff frequency of a lowpass filter unit, from first speed data based on at least one of a position of an information processing apparatus or a posture of the information processing apparatus;
outputting, by the lowpass filter unit, second speed data based on the removal of the component higher than the cutoff frequency;
executing a reduction process to reduce a change of the at least one of the position or the posture, wherein the reduction process is executed based on the second speed data;
acquiring reduction data based on the execution of the reduction process;
calculating a reduction error based on a difference between a displacement signal and the reduction data, wherein
the displacement signal corresponds to the second speed data output from the lowpass filter unit; and
executing a correction process to correct the reduction error, wherein
the correction process is executed based on temporal change data, and
the temporal change data indicates a temporal change associated with the at least one of the position or the posture.

11. A non-transitory computer-readable medium having stored thereon, computer-executable instructions, which when executed by a processor, cause the processor to execute operations, the operations comprising:
removing a component, higher than a cutoff frequency of a lowpass filter unit, from first speed data based on at least one of a position of an information processing apparatus or a posture of the information processing apparatus;
outputting, by the lowpass filter unit, second speed data based on the removal of the component higher than the cutoff frequency;
executing a reduction process to reduce a change of the at least one of the position or the posture, wherein the reduction process is executed based on the second speed data;
acquiring reduction data based on the execution of the reduction process;
calculating a reduction error based on a difference between a displacement signal and the reduction data, wherein
the displacement signal corresponds to the second speed data output from the lowpass filter unit; and
executing a correction process to correct the reduction error, wherein
the correction process is executed based on temporal change data, and
the temporal change data indicates a temporal change associated with the at least one of the position or the posture.

* * * * *